Oct. 17, 1950  J. J. BLOOMFIELD  2,526,324
POWER TRANSMITTING BELT
Filed Aug. 8, 1944  2 Sheets—Sheet 1
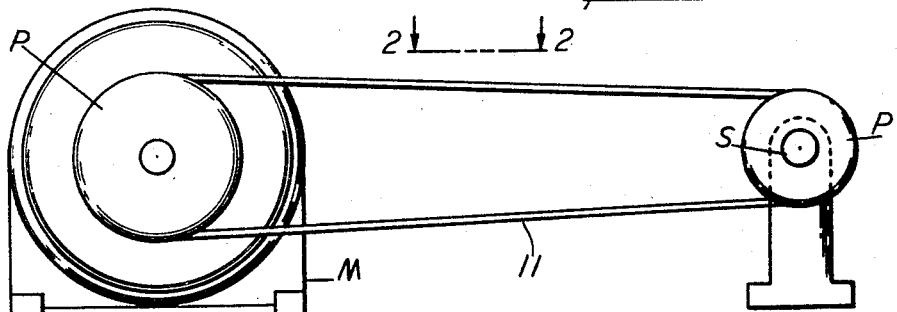
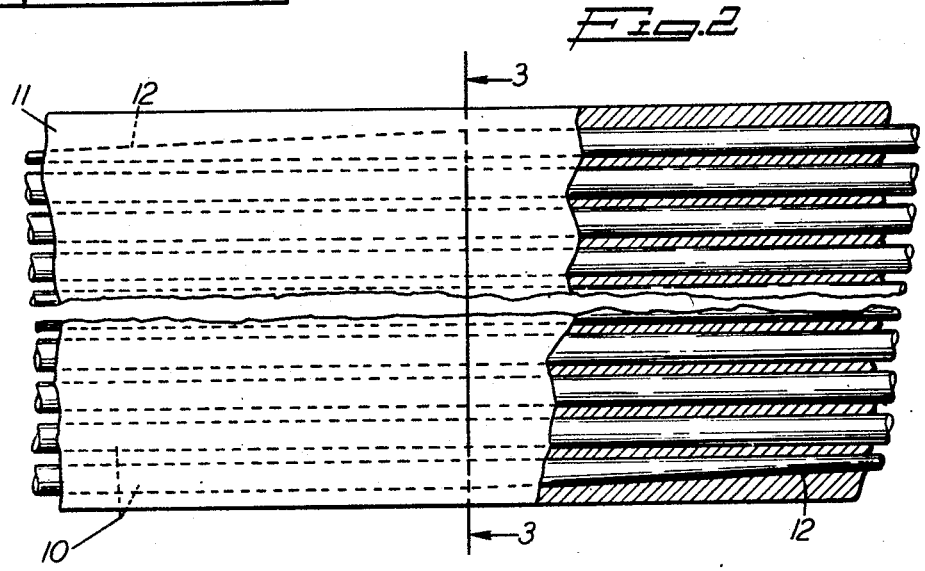
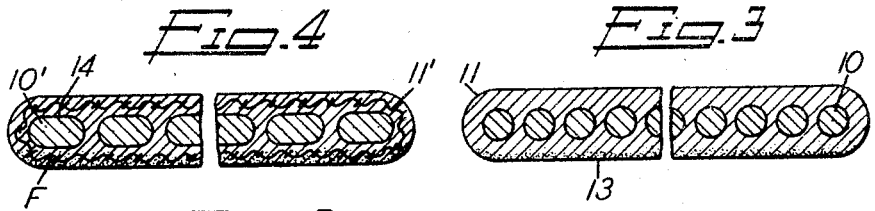
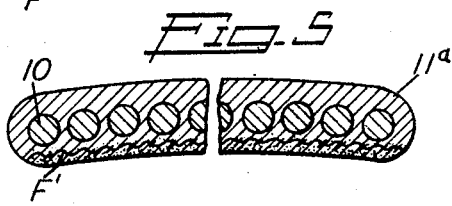
INVENTOR.
JOHN J. BLOOMFIELD
BY
George C. Sullivan
AGENT

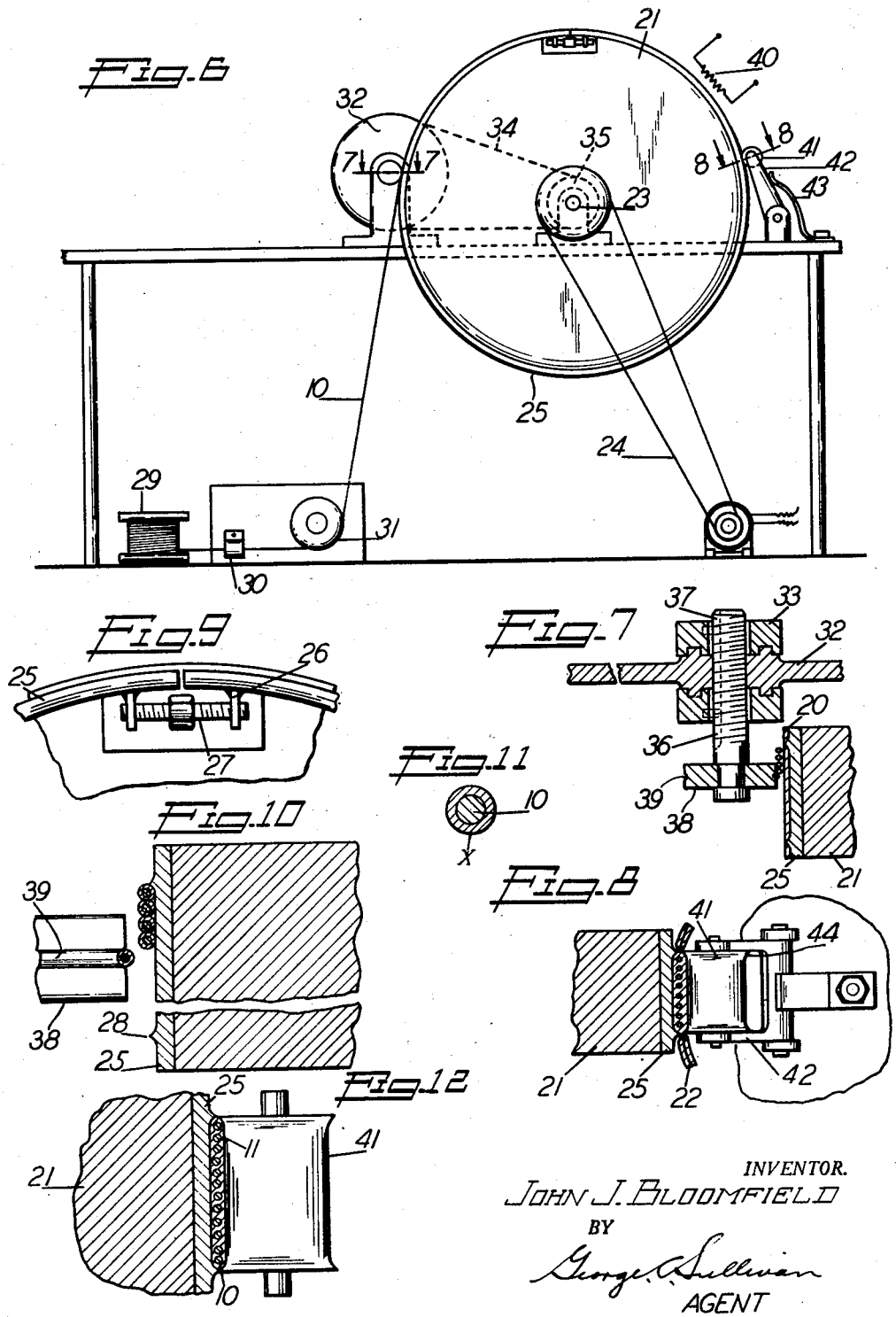

Patented Oct. 17, 1950

2,526,324

UNITED STATES PATENT OFFICE 2,526,324

POWER TRANSMITTING BELT

John J. Bloomfield, Burbank, Calif., assignor to Lockheed Aircraft Corporation, Burbank, Calif.

Application August 8, 1944, Serial No. 548,556

2 Claims. (Cl. 74—232)

This invention relates to power transmitting equipment, and relates more particularly to power transmitting belts and to methods of fabricating the same.

The belts now commonly employed for the transmission of power are constructed of leather, fabric, rubber, and combinations of such materials. These typical belting materials have relatively low tensile strengths and in situations where substantial power is being transmitted the belts must be thick and wide to carry the power loads. The wide belts necessitate the employment of heavy wide pulleys, and for this reason belt and pulley drives are not suited for installations where weight is an important factor. Owing to the inertia effects accompanying the operation of a belt at high lineal speeds it is impractical to use the thick heavy conventional belts where high speeds are necessary. Thus the physical characteristics of the belting materials have imposed definite limitations on the applications of belt and pulley drives, restricting them to situations where weight is not a controlling factor and where low speed operation is all that is required.

Power transmitting belts have been introduced embodying reinforcements of metal, textile fibers, etc., to lessen the tendency of the belts to elongate excessively when subjected to heavy loads. In such reinforced belts whether they be formed of leather, fabric, rubber or combinations of such materials, the belt body remains the power transmitting element and the reinforcement is simply a strengthening means. The reinforcing of conventional leather, rubber and fabric belts does not appreciably extend the range of application of belt and pulley drives. Where a reinforced belt is used the weight of the drive is substantially unchanged and the belt thickness is still of such a magnitude that the operational stresses due to centrifugal forces accompanying high speed operation preclude belt operation at high linear velocities.

An important object of the invention is to provide a power transmitting belt that is exceedingly thin and light in weight, and yet has great tensile strength. The characteristics of lightness and thinness, coupled with great strength, adapt the belt of the invention for the transmission of substantial power in high speed light weight installations where conventional belts could not be successfully employed. The light weight belt of the invention may be very thin so as to be capable of operation at high speeds with a minimum of operational stresses, and because of the belt's great tensile strength per square unit of cross section, it may be relatively narrow for use on narrow light weight pulleys. The characteristics and capabilities of the belt materially extend the range of utility and application of belt and pulley drives, adapting this class of power transmissions to high speed heavy load installations where conventional belts would be inadequate and unsatisfactory.

Another object of the invention is to provide a power transmitting belt of unique design and construction characterized by a continuous length of wire or a continuous strand, cord or thread of high tensile strength helically wound and maintained in the power transmitting condition by a protective enclosing sheath of abrasion resistant plastic material. In some applications the thermoplastic material of the sheath may be strengthened and its resistance to abrasion increased by incorporating fabric or fibrous material in the sheath material. In certain embodiments of the invention, a single length of steel music wire may constitute the load or power transmitting element of the belt, and the sheath in addition to preserving the wire in the condition for the most efficient utilization of its high tensile strength, protects the wire against corrosion, abrasion and interconvolution wear. The wire is entirely encased in the plastic material, and the latter, while it assumes only a very minor portion of the transmitted load, presents the pulley engaging surface. In other forms of the invention one or more continuous strands or threads of glass, nylon, or the like, form the power transmitting element, and are enclosed in a sheath of plastic. As distinguished from conventional reinforced belts where the belt body of leather, fabric or rubber assumes the load, and the reinforcement merely strengthens the body, the sheath of the present invention assumes practically no load and the high strength cord, thread or wire protected in the sheath transmits the bulk of the power. Thus the high tensile strength strand or wire is effectively utilized for the transmission of power in a belt, the overall thickness of which is kept at a minimum for high velocity operation.

Another object of the invention is to provide a power transmitting belt that is simple and inexpensive to manufacture and need embody only two parts or elements, namely a length of wire or the equivalent, and a thin sheath.

It is another object of the invention to provide a belt of the character referred to having a pulley engaging surface which assures effective frictional contact between the belt and pulleys.

The composition of the plastic material forming the thin protective sheath of the belt may be varied to provide a selected or required coefficient of friction to adapt the belt for a specific use or a given field of application and where circumstances requires a friction material such as cork may be incorporated in or applied to the belt surface.

It is another object of the invention to provide a power transmitting belt that does not require a splice or joint, that is not easily damaged at its edges and that may be readily produced in practically any width, length and thickness. In my application for patent, Serial Number 498,773, filed August 16, 1943, now Patent No. 2,429,119, dated October 14, 1947, I have disclosed a power transmitting belt comprising a thin ribbon of steel or other suitable metal, the ends of which are joined to form an endless unit. The edges of such a thin metal ribbon are sensitive to damage and care must be taken in forming the joint to insure correct belt length, as well as a strong dependable connection wherein the metal of the ribbon remains unchanged. In my present invention there is no necessity to form a joint, the belt edges are not easily injured, and the belt may be made to have any required length, width and thickness.

Another important object of the invention is to provide an expeditious and commercially practical method for fabricating light weight power transmitting belts of the class above referred to.

A further object of the invention is to provide a method for making a belt of the type referred to above which assures regular and correct spacing of the thread or wire convolutions and the laying or wrapping of the convolutions to occupy and remain in a common axial plane of the belt. The fine, small-diametered cord, thread or wire is extremely difficult to handle manually, and great care must be taken in the training or wrapping operation. The method of the invention provides for the automatic, rapid, precise wrapping of the thread or wire and assures its correct final disposition in the belt structure.

A still further object of this invention is to provide an efficient method for fusing and forming a thin plastic sheath to completely encase the power transmitting wire, or similar slender element, and maintain its convolutions in spaced relation.

Other objects and features of the invention will be readily understood from the following detailed description of typical preferred forms of the invention wherein reference will be made to the accompanying drawings in which:

Figure 1 is a side elevation or edge view of a belt of the invention operating between two pulleys;

Figure 2 is a greatly enlarged fragmentary plan view of the belt taken as indicated by line 2—2 on Figure 1 with a portion appearing in horizontal cross section;

Figure 3 is a greatly enlarged transverse sectional view taken as indicated by line 3—3 on Figure 2;

Figures 4 and 5 are views similar to Figure 3 illustrating other forms of belts of the invention;

Figure 6 is a diagrammatic side elevation of an apparatus useful in carrying out the belt forming method of the invention;

Figure 7 is an enlarged fragmentary sectional view taken as indicated by line 7—7 on Figure 6;

Figure 8 is an enlarged fragmentary sectional view taken as indicated by line 8—8 on Figure 6 with certain parts appearing in elevation;

Figure 9 is an enlarged fragmentary side elevation of the drum, illustrating the means for expanding and contracting its rim;

Figure 10 is an enlarged fragmentary sectional view illustrating another mode of carrying out the method of the invention;

Figure 11 is a greatly enlarged sectional view of the covered wire employed in forming the belt; and Figure 12 is an enlarged fragmentary sectional view illustrating the manner in which the sheath of the belt is formed.

I will first proceed with a description of several typical belts of the invention and follow such description with a disclosure of the method of fabricating the belts.

The belt of the invention illustrated in Figures 1, 2 and 3 comprises a power transmitting element 10 in the form of a length of wire, or the like, and a sheath 11 for the element.

The belt of this invention is characterized by the nature of its power transmitting element. In certain embodiments of the invention a single continuous length of wire serves as the active or load carrying element, although where the conditions of intended use so require, two or more such lengths of wire may be employed. In the belt structure illustrated in Figures 2 and 3 there is a single uninterrupted length of wire 10 for transmitting the load or power. The load transmitting element or wire 10 is of a high strength type and for high speed installations it is desirable to use steel music wire or piano wire. By employing the music wire, advantage is taken of the great tensile strength developed by the cold working of a steel member of small cross sectional dimensions. For example, steel music wire of .004 inch in diameter has a minimum breaking strength of 400,000 pounds per square inch, and a maximum breaking strength of 440,000 pounds per square inch, while wire of the same type and quality .070 inch in diameter has a minimum breaking strength of 242,000 pounds per square inch and a maximum breaking strength of 262,000 pounds per square inch. It is to be understood that the invention is not to be construed as limited to the employment of music wire .004 inch in diameter, or of any other given diameter, the comparison of relative tensile strengths being supplied merely for the purpose of disclosing the great tensile strengths of the preferred class of wire and the desirability of utilizing wire of small cross sectional dimensions so that maximum tensile strength is obtained in a belt of minimum thickness. The diameter of the load transmitting element 10 employed in the belt will depend to a large extent upon the power to be transmitted, the intended speed of belt operation, the width of the belt, etc.

The power transmitting element or wire 10 is spirally or helically wound to have a multiplicity of windings or convolutions. As illustrated in Figure 3, there is a single layer or row of convolutions occupying a common flat plane, the wire 10 initially being wound about a single axis to have convolutions of identical diameter. It is preferred to utilize a single continuous length of wire 10 to form the multiplicity of convolutions, thus avoiding the necessity of joints and obtaining maximum tensile strength for the transmission of power. The adjacent convolutions of the elements 10 are spaced apart axially of the belt and it is preferred to space them uniformly. The spacing of the convolutions will vary in different applications of the belt. Where it is desired to obtain maximum tensile strength in a narrow belt of a given overall thickness, the adjacent convolutions may be spaced apart a distance approximately equal to one fourth of the diameter of the wire, and in cases where the width of the belt is not a controlling factor or where less tensile strength is required, the spacing of the convolutions may be increased to, say, one half the diameter of the wire. In this connection it is to be observed that by employing music wire of small diameter, .010 inch, for example, and by coiling or wrapping its convolutions in spaced adjacent relation, an exceedingly thin belt of great tensile strength is obtained.

Where wire of this diameter is utilized, 60 convolutions may be formed in a belt of three quarters of an inch overall width. It will be apparent that by increasing the number of convolutions, the tensile strength of the belt may be proportionately increased. It is preferred to scarf the opposite end portions of the wire 10 as shown at 12 in Figure 2 to reduce to a minimum the irregularities or shoulders present at the terminii of the wire. If long scarfs are made, the edges of the wire winding or coil are substantially regular. The invention contemplates the employment of various selected forms of power transmitting elements. As above described, the power transmitting element of the belt may comprise a continuous length of metal wire of high tensile strength. Instead of utilizing metal wire, a cord or thread of glass filaments or synthetic fibers may be incorporated in the belt for the transmission of power. Glass filaments or strands have an exceedingly high tensile strength and may be spun or otherwise associated to form a thread of great strength. A continuous glass thread of this character is well suited to form the power transmitting element 10 of the belt. It may be found desirable to have the individual glass filaments in as nearly parallel relation as possible, or to minimize the twisting or spinning of the filaments, to reduce wear and friction between the filaments and to lessen the elongation and elasticity of the cord or thread. It may also be desirable to treat or impregnate the glass thread with a suitable lacquer or plastic to bind the several strands or filaments together and to increase the strength of the thread. Where a synthetic thread is made to serve as the power transmitting element 10, it may likewise be treated with a lacquer or the like, and it may be of such character that its individual filaments or fibers are generally parallel or are spun to a minimum extent. The thread, whether it be formed of glass, nylon or other material, is employed in the same manner as the above described wire 10, being in the form of a helically wrapped continuous member with its several convolutions substantially lying in a common plane. The diameters of the glass or synthetic filament threads may be comparable, generally, with the diameters of the steel wire whereby the dimensions of a belt of a given rated strength may be substantially the same in any case. In some instances it may be necessary or desirable to embody two or more superimposed layers of convolutions made by helically wrapping or training the selected form of threads, strands or wires.

The sheath 11 operates to maintain the power transmitting element 10 in its wrapped or coiled state for the dependable transmission of power, protects the element 10 against abrasion and corrosion, and presents the pulley engaging surface of the belt. In accordance with the invention, the sheath 11 entirely encases the element 10 and encloses its several individual wrappings or convolutions. As best illustrated in Figure 3, the material of the sheath 11 entirely surrounds each convolution of the wire, thread or element 10 and fully occupies the spaces between the convolutions. The sheath 11 extends beyond the endmost windings of the element 10 to present the edges of the belt and has an appropriate thickness at opposite sides of the coiled element to present the opposite broad faces of the belt. The sheath 11 is formed of a material that is flexible, yet strong and tough, and that is wear and abrasion resistant. I prefer to form the sheath 11 of a suitable thermoplastic material such as Saran, a co-polymer of polyvinylidene chloride marketed by the Dow Chemical Company, or nylon, a polyamide marketed by Du Pont de Nemours Corporation. Such plastics are strong and wear resistant and are readily molded, extruded or otherwise applied to the wire 10.

The material of the sheath 11 adheres directly to the wire or other slender member forming the element 10, and the character of the material is such that the convolutions of the element are effectively held against relative axial and radial displacement. Accordingly, the element 10 is preserved in its helically wound condition for the dependable transmission of substantial power without appreciable elongation. When the material of the sheath 11 is such that it does not effectively bond with or adhere to metal, and the element 10 is in the form of a wire, the wire may be provided with a thin covering or wrapping of cotton, or the like, to assure the proper bonding of the sheath material with the element 10 and to prevent separation of the element 10 and the sheath 11. The sheath 11 extends beyond the edges of the coil-like element 10 to encase the ends 12 of the element, and as illustrated, the edges of the sheath may be smooth and convexedly curved to provide the belt with suitable edges. The overall thickness of the sheath 11 may be varied considerably in different intended applications of the belt. The sheath 11 is not the power transmitting element, and therefore its thickness may be kept at a minimum. For example, in a belt intended for high speed operation, the total thickness of the sheath 11 may be approximately twice the diameter of the element 10. It will be seen that where wire thread or cord of small diameters such as referred to above, is employed as the element 10, the total thickness of the belt will be but a small fraction of an inch.

The broad surfaces, or at least the active face of the sheath may be ribbed, roughened, or otherwise surfaced to have effective frictional cooperation with the pulleys P. The composition of the thermoplastics of the character above referred to may be varied to provide the sheath 11 with a high coefficient of friction so that it is unnecessary to give the belt a special friction surface. In Figure 3 I have shown the active face of the sheath 11 provided with a friction material 13 to increase the co-efficient of friction of the belt. While many different material are suitable for the purpose, I prefer to impregnate the active surface of the belt with cork dust, cork being substantially unaffected by the presence of oil and being very long wearing.

The belt of Figures 1, 2 and 3 is intended to operate over pulleys P having flat cylindrical rims or faces, the active surface of the belt sheath 11 being flat and without curvature or crown. Figure 1 diagrammatically illustrates the manner in which the belt may operate over a pulley P of a motor M and a driven pulley P on a remote shaft S. In the several figures of the drawings where the element 10 appears, it may be considered as exaggerated in diameter or cross sectional dimensions, it being understood that in practice the power transmitting element may have an extremely small diameter and that the sheath may be proportionately small in thickness. It is to be understood that the belt is a continuous or endless elongate flexible unit capable of ready handling and easy installation on the pulleys P.

Figures 4 and 5 illustrate alternative belt structures of the invention. In Figure 4 the power transmitting element 10' is elongated in cross section. The element 10' has flat substantially parallel side surfaces 14 and rounded edge surfaces, and may be a partially flattened steel wire or a cord, or thread of glass, or synthetic filaments acted upon or formed to have this cross sectional configuration. The element is arranged or wound so that its flat surfaces 14 extend axially of the belt to be in parallel relation to the broad surfaces of the sheath 11'. This disposition of the flattened element 10' provides for a belt of reduced thickness for a given capacity or aggregate tensile strength. By arranging the load transmitting element 10' to have its major transverse axis extending transversely of the belt, the maximum strength is obtained in a minimum thickness of the belt. I have shown the sheath 11' of Figure 4 reinforced by fibrous material so that the strength and abrasion resistance of the thermoplastic material is increased or supplemented to more dependably retain the element 10' in its power transmitting condition. One or more plies or layers of fabric F may be molded or embedded in the material of the sheath. A single layer of the fabric F is shown cast or molded directly in the sheath 11' to be in spaced surrounding relation to the row of convolutions and to be spaced from the various surfaces of the sheath. The fabric F may be composed of natural or synthetic fibers, or may be formed of spun glass. Glass fabric is well adapted for the purpose because it is strong and unaffected by free acids that may be present in the material of the sheath. There may be a single strip of fabric whose opposite edge portions are folded or bent back over a side of the row of convolutions. The fabric F may initially be untreated or may be pre-impregnated with a suitable plastic. Such pre-impregnated fabric materials are marketed as Lignolite, Cellastic, Chemold, Dilecto, Micarta, etc. The fabric F is not intended as a primary load transmitting element, but as a strengthening means for the sheath 11' whose function is to maintain the load transmitting element 10' in its operative condition. In Figure 5 I have illustrated a belt intended for use on pulleys having crowned rims or surfaces. The belt structure of Figure 5 may be the same as in Figures 1 to 4 except that the row of load transmitting convolutions and the sheath 11ᵃ are both arcuate or curved in cross sectional configuration. The belt is transversely curved about an axis spaced inwardly from its active inner surface. The radius of curvature depends upon the application of the belt. Instead of the curvature illustrated, the belt may be somewhat V-shaped in cross section to cooperate with pulleys having correspondingly shaped surfaces or rims. The power transmitting element 10 of the belt may be cylindrical as illustrated, or may be elongated in cross section as shown in Figure 4.

The sheath 11ᵃ of Figure 5 is reinforced by an internal layer of fabric F''. In this case a single layer of fabric is arranged at one side of the row of convolutions. The fabric F'' may be painted with or immersed in a plastic material in a liquid state at the time of belt fabrication or may be a pre-impregnated material of the character referred to above. In the final belt structure the fabric is directly embedded or cast in the side wall of the sheath. It is to be understood that except for the features just described, the belts of Figures 4 and 5 may be of the same construction as the belt of Figures 1, 2 and 3.

From the foregoing description it will be seen that I have provided power transmitting belts of high tensile strength, low weight and exceedingly small thickness. The extreme thinness of the belts provides for very low compression and tensile stresses in the opposite sides of those portions of the load transmitting convolutions operating over the pulleys. This allows the belts to be operated at high linear speeds over pulleys of small diameter, as well as pulleys of larger diameters. The low weight of the belts allows operation at high linear speeds without the development of excessive stresses caused by centrifugal forces. Because of these inherent capabilities of the belts, substantial power may be transmitted by employing drive pulleys having larger diameters than the driven pulleys, and in such situations, speed reduction units may be provided at the driven pulleys to reduce the speed of the driven elements. The high tensile strength wire or element 10 is maintained in its most efficient power transmitting condition by the enclosing sheath 11. The material of the sheath 11 between the adjacent convolutions of the element operates under shear to resist relative axial movement between the convolutions, maintaining the element 10 in the condition where its several windings act as a unit in the transmission of the load. Thus the sheath 11, while it does not of itself serve to transmit any appreciable power, develops the maximum tensile strength of the wire or element 10. There is little tendency for the individual convolutions of the element 10 to break or part, even upon excessive loading of the belt, and in the event the element does part at one point, there will be no sudden failure of the entire belt. The material of the sheath 11 may be transparent or semitransparent so that the condition of the wire or element 10 may be readily determined upon visual inspection.

Figures 6 to 9 inclusive illustrate a suitable apparatus for carrying out the belt fabricating method and show several steps of one manner of carrying out the method of the invention. I will describe the method of fabricating the belt illustrated in Figures 1, 2 and 3, it being understood that suitable variations may be made in producing the belts of Figures 4 and 5. I will also refer to the load transmitting element as a wire 10, it being apparent that the method will be the same where a thread, cord, or the like, is to be embodied in the belt as the load transmitting member. In this mode of performing the method, a layer or strip 20 of plastic material is first arranged on a drum 21, the wire 10 is then wound on the plastic strip 20, a second plastic strip 22 is then laid over the wound wire 10 and finally the plastic strips 20 and 22 are subjected to pressure and heat to be fused into a single sheath 11 completely encasing the wire.

In the diagrammatic illustration of Figure 6, the drum 21 is supported by a shaft 23 to be driven by a suitable power drive 24. A metal rim 25 is removably arranged on the periphery of the drum. The rim 25 is expansible and contractable and means is provided for producing the expansion and contraction. This means includes lugs 26 on the inner side of the rim 25 adjacent its split, and a screw 27 which has threads of opposite pitch are engaged in threaded openings in the lugs. The periphery of the rim 25 is cylindrical to receive the plastic strip 20. I have shown axially spaced annular forming and cutting ridges 28 on the rim 25 to assist in shaping the edges of the sheath. The plastic strip 20 is trained on the rim 25 to flatly engage thereon and is tensioned to conform to the rim and its ridges 28. The strip 20 is arranged to extend completely around the rim 25 and its ends are brought together and temporarily secured by adhesive, cement or tape. Owing to the tendency of the thermoplastic material to shrink when subjected to heat it is desirable to have the opposite end portions of the strip 20 overlap to some extent when the strip is initially arranged on the rim 25. It is preferred to employ a strip 20 of sufficient width to extend axially beyond both ridges 28. The surface of the rim 25 should be coated or otherwise treated prior to the application of the strip 20 to prevent the thermoplastic material of the strip from adhering to the rim when the material is subjected to heat and pressure.

When the plastic strip 20 has been arranged on the drum rim 25, the wire 10 is wound onto the strip. The free end of the wire is temporarily secured to the rim 25 by tape or cement and the drum is rotated so that the wire is spooled onto the rim. The supply of wire 10 may be provided on a spool 29 and the wire passes from the spool to a tensioning device 30 and thence to a pulley 31 which directs it onto the drum rim 25. While the wire 10 may be manually guided and fed to the drum 21 to cause its convolutions to have the required spacing, it is usually preferred to mechanically feed and direct the wire to assure uniform spooling thereof. As illustrated in Figures 6 and 7, a pulley 32 is rotatably supported between bearings 33 and is driven by a belt 34 operating over a pulley 35 on the drum shaft 23. A feed screw 36 is threaded through the pulley 32 and is held against rotation by a lug and key-way arrangement 37 so as to be translated axially upon rotation of the pulley. A wheel or disc 38 is freely rotatable on the projecting portion of the screw 36 to be adjacent the face of the rim 25. A peripheral groove 39 is formed in the disc 38 to receive the wire 10 as it passes onto the rim 25. Upon operation of the power drive 24 the drum is slowly rotated to draw the wire 10 onto the strip 20 of plastic material and the pulley 32 is rotated to advance the disc 38 across the face of the rim at a given rate as determined by the lead of the thread on the screw 36. Thus the wire 10 is mechanically wound onto the plastic strip 20 under a given tension with its convolutions uniformly spaced across the strip. When the required number of convolutions of wire has been wound on the plastic strip 20, the wire 10 is cut and the free end of the endmost convolution is temporarily secured to the strip by cement, tape, or the like.

At the completion of the wire wrapping or spooling operation, the second strip 22 of thermoplastic material is laid over the spooled wire 10 and trained about the rim 25 to extend the full 360°. The ends of the outer strip 22 are brought together and temporarily secured by tape or cement, or by light fusing with the inner strip 20. The strip 22 may initially be of the same width and thickness as the strip 20. Prior to the application of the second strip 22 it may be found desirable to paint or spray the spooled wire 10 with a liquid solution of the selected thermoplastic material to assure complete adhesion of the material to the wire and to assure the filling of the spaces between the wire convolutions.

The final step of the method is the subjection of the thermoplastic strips 20 and 22 to heat and pressure to melt or fuse them together to constitute the endless homogeneous sheath 11. Any selected means may be utilized to locally heat a limited zone of the strips 20 and 22. In the diagrammatic illustration, an electric heating element 40 is arranged adjacent the drum 21 to heat the strips. The heating means is operable to bring the thermoplastic material of the strips 20 and 22 to a temperature which renders it plastic or semi-fluid. A pressure applying means is positioned adjacent to but in advance of the heating means 40 relative to the direction of rotation of the drum 21. I have shown a roller 41 supported on a pivoted lever 42 and urged toward the drum 21 by spring means 43. The periphery of the roller 41 is shaped to assist in giving the sheath 11 its final form. Shaping and cutting ridges 44 are formed on the pressure roller 41 for cooperating with the ridges 28 of the rim 25 to shape and trim the edges of the sheath. The drum 21 is rotated and the heating means 40 is energized to heat the portions of the strips 20 and 22 which are moving toward the roller 21. The heating means 40 brings the material of the strips 20 and 22 to a temperature where it is semi-fluid and the material of the two strips is fused together as it passes under the roller 41. The action of the pressure roller 41 on the semi-fluid plastic material bonds and fuses the strips together into a single jointless and homogeneous body. The plastic material flows between and is pressed between the convolutions of the wire 10 to completely occupy the spaces between the convolutions and to intimately adhere to the wire 10. Simultaneously with the fusing together of the strips 20 and 22, the rim 25 and the pressure roller 40 shape the sheath 11 to its final configuration and dimensions, the ridges 28 and 44 shaping the edges of the sheath and trimming off the excess sheath material. The rotation of the drum 21 is continued until the entire sheath 11 has been formed into a single endless and homogeneous body of flexible material completely encasing the wound wire 10. The heating means 40 is then de-energized and the pressure roller 41 is retracted. The screw 27 may be operated to expand the rim 25 for easy removal from the drum 21. The freed rim may then be twisted or warped to release or free the sheath 11. The belt thus disengaged from the rim 25 is complete and ready for use.

In carrying out the belt forming methods steps illustrated in Figures 10 and 12, the apparatus of Figures 6 to 9 may be employed. In this case the thermoplastic material is associated with the wire 10 before the wire is wound onto the drum 21. Wire 10, or a thread or cord of glass or synthetic fibers of the selected diameter is covered with a continuous tubular sheath or layer of the thermoplastic material X. Figure 11 is a greatly exaggerated transverse section of the wire 10 and its thermoplastic material covering X. The thermoplastic material may be readily extruded onto the wire and the wire may be supplied to the belt fabricator in this form. The plastic covered wire 10 is trained onto the rim 25 of the drum 21 by rotating the drum and employing the above described feed disc 38 provided with a groove 39 of sufficient size to handle the covered wire. Figure 10 illustrates the manner in which the covered wire is spooled onto the rim 25. It will be observed that the covering X of the wire assists in accurately spacing the wire convolutions.

When the pre-covered wire 10 has been wound on the rim 25 and its ends temporarily secured, the thermoplastic material on the wire is subjected to heat and pressure to form the sheath 11. The heating means 40 and the pressure roller 41, or equivalent means, may be employed to locally heat the thermoplastic material and then immediately subject it to pressure so that the covering X is rendered semi-fluid and then pressed into a continuous homogeneous sheath. The operation is continued until the entire sheath 11 has been formed. Figure 12 illustrates the manner in which the pressure roller 41 and the rim 25 cooperate to give the sheath 11 its final form. The completed belt is then removed from the rim 25 in the manner described to complete the operation.

Having described only typical forms and procedures, I do not wish to be limited to the details herein set forth, but wish to reserve to myself any variations or modifications that may appear to those skilled in the art or fall within the scope of the following claims.

I claim:

1. A light weight high tensile strength power transmitting belt adapted for high speed operation comprising a continuous slender element of high tensile strength helically wound to have a row of spaced convolutions, an integral continuous sheath of flexible plastic encasing the convolutions, and a continuous strip of fabric embedded within the sheath in spaced surrounding relation to said row of convolutions.

2. A light weight high tensile strength power transmitting belt adapted for high speed operation comprising a load transmitting element of small diameter helically wound to have a row of spaced convolutions, a sheath of flexible synthetic plastic material encasing the convolutions, and at least one continuous strip of glass fabric molded in the sheath to reinforce the same, said strip being spaced from the external surface of the sheath and being in spaced substantially surrounding relation to said row of convolutions.

JOHN J. BLOOMFIELD.

REFERENCES CITED

The following references are of record in the file of this patent:

UNITED STATES PATENTS

| Number | Name | Date |
|---|---|---|
| 336,990 | Chase | Mar. 2, 1886 |
| 556,663 | Dennison | Mar. 17, 1896 |
| 1,129,666 | Gray | Feb. 23, 1915 |
| 1,223,742 | Slopper | Apr. 24, 1917 |
| 1,277,711 | Gammeter | Sept. 3, 1918 |
| 1,287,703 | Lambert | Dec. 17, 1918 |
| 1,341,470 | Kinnaird | May 25, 1920 |
| 1,412,310 | Lambert | Apr. 11, 1922 |
| 1,430,541 | Frederick | Oct. 3, 1922 |
| 1,465,389 | Fisher | Aug. 21, 1923 |
| 1,956,545 | Schrader et al. | Apr. 24, 1934 |
| 1,977,108 | Arnberg | Oct. 16, 1934 |
| 2,112,525 | Foster | Mar. 29, 1938 |
| 2,114,517 | Apel et al. | Apr. 19, 1938 |
| 2,135,057 | Slayter | Nov. 1, 1938 |
| 2,273,200 | Hoff | Feb. 17, 1942 |